(12) United States Patent
Su

(10) Patent No.: US 6,650,316 B2
(45) Date of Patent: Nov. 18, 2003

(54) MOUSE WITH REPLACEABLE PUSH PANEL

(75) Inventor: Chih-Wen Su, Chung Ho (TW)

(73) Assignee: Behavior Tech Computer Corporation, Taipei (TW)

( * ) Notice: Subject to any disclaimer, the term of this patent is extended or adjusted under 35 U.S.C. 154(b) by 120 days.

(21) Appl. No.: 09/893,281

(22) Filed: Jun. 28, 2001

(65) Prior Publication Data

US 2003/0011570 A1 Jan. 16, 2003

(51) Int. Cl.[7] .................................................. G09G 5/08
(52) U.S. Cl. ...................................................... 345/163
(58) Field of Search ................................ 345/163, 164, 345/156, 157, 165, 167, 169; 463/37; D14/402

(56) References Cited

U.S. PATENT DOCUMENTS

| | | | | |
|---|---|---|---|---|
| 5,851,623 A | * | 12/1998 | Tarulli et al. | 428/68 |
| 6,031,522 A | * | 2/2000 | Strand | 345/163 |
| 6,225,981 B1 | * | 5/2001 | Lu | 345/164 |
| 2003/0090464 A1 | * | 5/2003 | Lai et al. | 345/163 |

FOREIGN PATENT DOCUMENTS

JP          09319515     * 12/1997

* cited by examiner

Primary Examiner—Richard Hjerpe
Assistant Examiner—Ronald Laneau
(74) Attorney, Agent, or Firm—Rosenberg, Klein & Lee

(57) ABSTRACT

A mouse with replaceable push panel comprising a push panel and a base unit. At an appropriate position of the base unit, such as its front or its rear, there is at least one embedding unit, the embedding unit having a trough, at the bottom of the trough being a check unit, on the push panel and opposite the embedding unit being a fastening key, at the end of the fastening key being a cone-shaped fastening unit. When the push panel is joined to the base unit, the fastening key penetrates the trough of the embedding unit, and its cone-shaped fastening unit is then fastened to the check unit, or they may also be pulled apart by separate the push panel from the base unit, for the purpose of convenient replacement of the push panel. Besides, inside the push panel can be installed a battery compartment to accommodate a battery for its application to a wireless mouse.

4 Claims, 3 Drawing Sheets

MOUSE WITH REPLACEABLE PUSH PANEL

BACKGROUND OF THE INVENTION

1. Field of the Invention

The invention relates to a mouse with replaceable push panel, particularly one with its push panel changeable to a different color in a simple and speedy process.

2. Background of the Invention

Due to limited variation of functions, the design of conventional mice is generally restricted to the change of configuration. No one has yet come up with the idea with a mouse which casing or push panel can be changed. Since the introduction of changeable housing for mobile phones, many mouse users learn to change their mouse to different colors. For that purpose, they have no alternative but to change the entire mouse unit, yet it seems too costly to buy a whole new mouse just for the change of color.

As a matter of fact, the price of a mouse is not high. But that problem has been troubling the users, particularly the young generation. In view of that, the inventor has dedicated in intensive research and after repeated tests, had come up with a mouse with replaceable push panel, so the user can quickly and convenient change a different push panel. Of course, the housing of the entire mouse can also be changed, to another color for example, to satisfy the user's sense of fashion and comfort.

BRIEF DESCRIPTION OF THE INVENTION

The primary objective of this invention is to provide a mouse with replaceable push panel, comprising a push panel and a base unit. At an appropriate location of the base unit is an embedding unit, the embedding unit has a trough, and at the bottom of the trough is a check unit. On the push panel and opposite the embedding unit is a fastening key. At the end of the fastening key is a cone-shaped fastening unit. When the push panel is joined to the base unit, the fastening key penetrates the trough of the embedding unit, and its cone-shaped fastening unit is joined to the check unit, then the two units are fastened. Likewise, the push panel and the base unit can be separated merely by pulling them apart, to enable convenient replacement of the push panel at any time.

Another objective of the invention is to provide a mouse with replaceable push panel, wherein inside the push panel can be installed a battery compartment to accommodate a battery, so that it can be applied to a wireless mouse.

BRIEF DESCRIPTION OF DRAWINGS

The drawings of preferred embodiments of this invention are described in following details to enable better understanding.

DETAILED DESCRIPTION OF PREFERRED EMBODIMENTS

Figure 1:
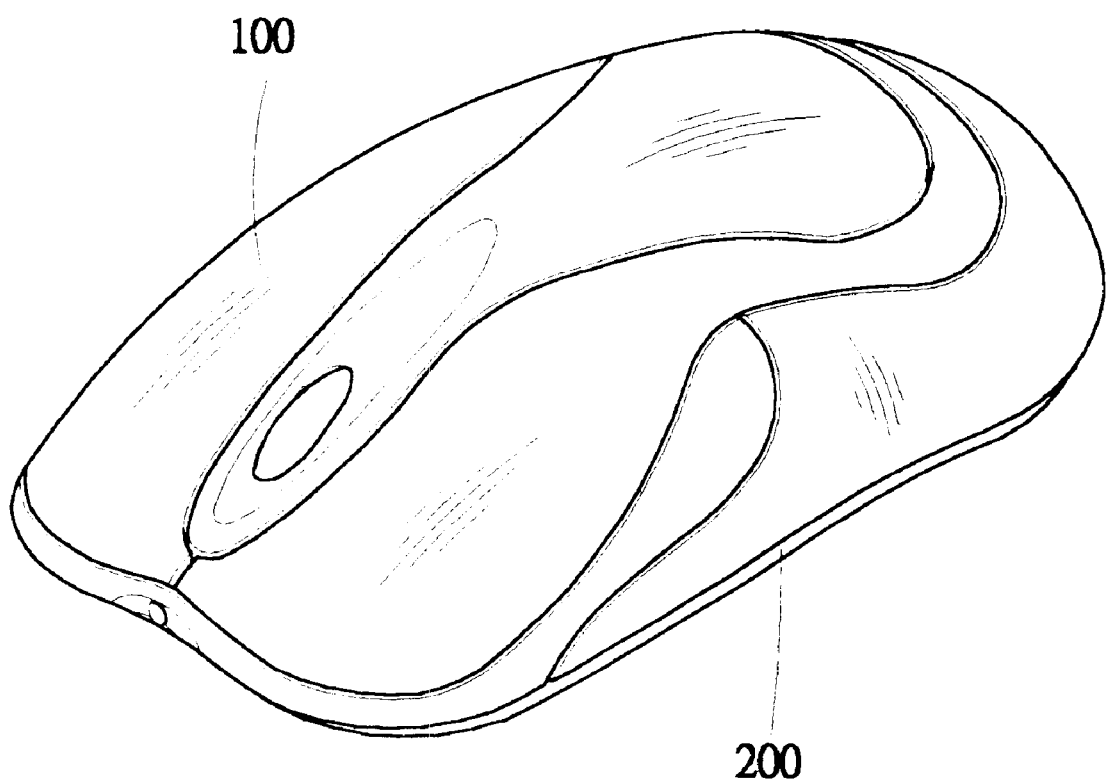
FIG. 1 is a perspective view of the invention of a mouse with replaceable push panel.
Figure 2:
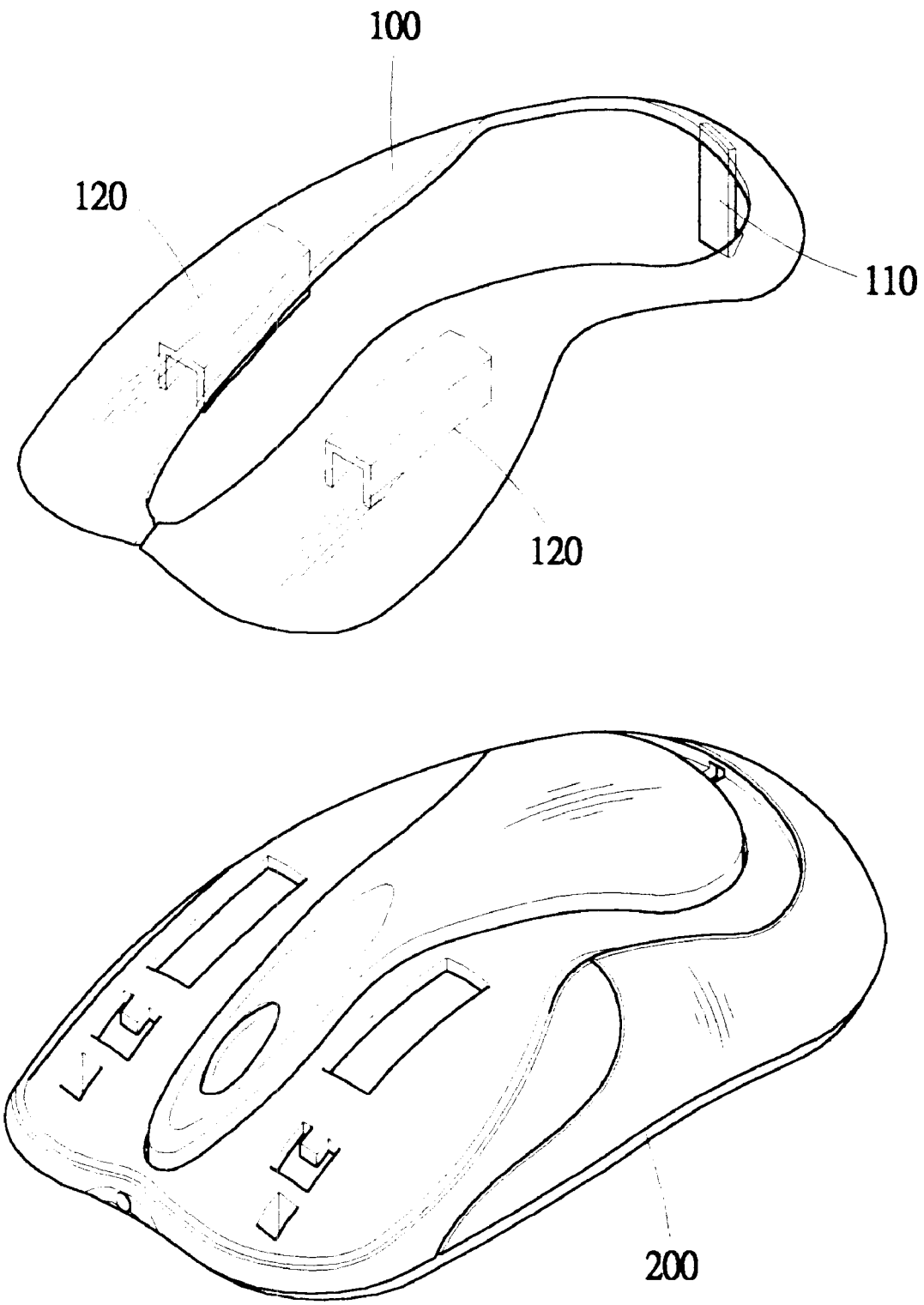
FIG. 2 is an exploded view of the invention of a mouse with replaceable push panel, with broken lines indicating a battery compartment.

As shown in FIGS. 1 and 2, the invention of mouse with replaceable push panel, comprising a push panel 100 and a base unit 200. At an appropriate position of the base unit 200, such as the front or the rear, there is at least one embedding unit 210. The embedding unit 210 has a trough 211 (shown in FIG. 3), and a check unit 212 is formrf at the bottom of the trough 211.

Figure 3:
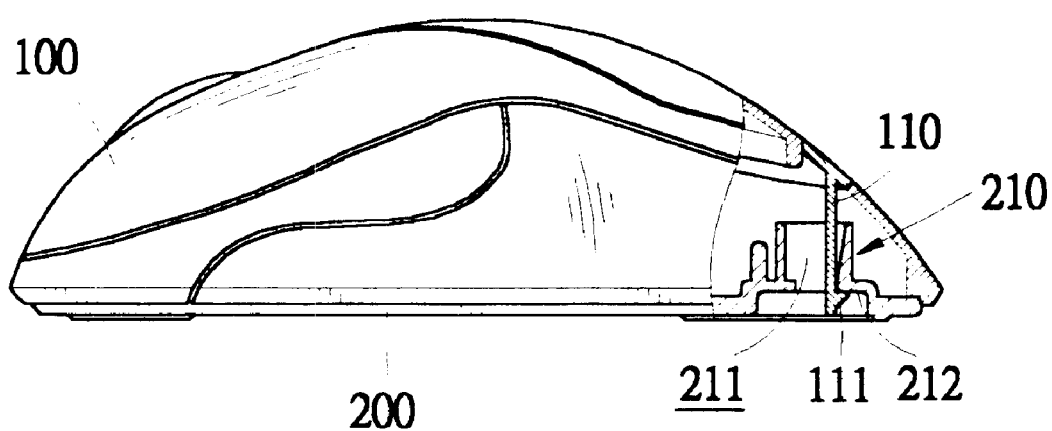
FIG. 3 is a section view of the invention, showing the connection between the push panel and the base unit.

On the push panel 100 and opposite the embedding unit, there is a fastening key 110. At the end of the fastening key 110, there is a cone-shaped fastening unit 111. When the push panel 100 is joined to the base unit 200, the fastening key 110 penetrates the trough 211 of the embedding unit 210, its cone-shaped fastening unit 111 is then fastened to the check unit 212 (as shown in FIG. 3).

Since the connection of the fastening unit 111 and the check unit 212 is made mainly by the engagement of the bottom plane of the cone unit of the fastening unit 111 with the plane of the check unit 212, and because the fastening key 110 and the embedding unit 210 are both made of plastic materials with adequate flexibility, it is quite easy to join the two units. Likewise, it is quite easy to disassemble them by simply pull the push panel apart from the base unit because of flexibility of the plastics. If various push panels 100 or the entire casing in different colors are available at hand, the user will be able to change the push panel and the casing at any time as he sees fit.

Besides, inside the push panel 100 can be installed a battery compartment 120 to accommodate the battery. Therefore, this invention can also be used on a wireless mouse.

What is claimed is:

1. A mouse with replaceable push panel, comprising a push panel and a base unit, the base unit including therein an embedding unit defining a trough, and having a check unit portion adjacent the trough; the push panel detachably overlaying an upper portion of the base unit, the push panel including a fastening key projecting therefrom to pass through the trough of the embedding unit, the fastening key terminating at a fastening unit portion engaging the check unit portion in releasably locked manner, whereby the push panel is assembled onto and disassembled from the base unit in user selective manner.

2. The mouse with replaceable push panel as claimed in claim 1, wherein the push panel defines at least one accommodating chamber to accommodate a battery for a wireless mouse.

3. A mouse having interchangeable push panel structure comprising:

a base unit including therein an embedding unit defining a trough, said embedding unit having a check unit portion adjacent the trough, said base unit having a recessed portion formed to extend across an upper surface thereof; and, a resilient push panel engaging to detachably cap said recessed portion of said base unit, said push panel including a fastening key projecting transversely therefrom to pass through said trough of said embedding unit and engage said check unit portion in releasably locked manner, whereby said push panel is disposed on said base unit to be interchangeable with another thereof.

4. The mouse as claimed in claim 3, wherein said push panel defines at least one accommodating chamber for accommodating a battery for a wireless mouse.

* * * * *